United States Patent [19]
Weisenbarger et al.

[11] Patent Number: 4,995,425
[45] Date of Patent: Feb. 26, 1991

[54] MAGNETIC FLUID CONDITIONER

[76] Inventors: Gale M. Weisenbarger, 140 Woodland Dr., Eaton, Ohio 45320; John C. Moran, 3124 Lake Ave., Fort Wayne, Ind. 46805

[21] Appl. No.: 522,091

[22] Filed: May 11, 1990

[51] Int. Cl.⁵ .................................. F15C 1/04
[52] U.S. Cl. .................... 137/827; 137/809; 210/222
[58] Field of Search .......... 137/827, 807, 803; 210/222, 695

[56] References Cited

U.S. PATENT DOCUMENTS

| | | | |
|---|---|---|---|
| 3,349,354 | 10/1967 | Miyata | 210/222 |
| 3,923,660 | 12/1975 | Kottmeier | 210/222 |
| 4,146,479 | 3/1979 | Brown | 210/222 |
| 4,210,535 | 7/1980 | Risk | 210/222 |
| 4,265,755 | 5/1981 | Zimmerman | 210/222 |
| 4,605,498 | 8/1986 | Kulish | 210/695 |
| 4,711,271 | 12/1987 | Weisenbarger et al. | 137/827 |

Primary Examiner—A. Michael Chambers
Attorney, Agent, or Firm—Louis E. Hay

[57] ABSTRACT

A magnetic fluid conditioner for abating the adherence of precipitates in conduits transmitting a variety of liquids and/or gases which contain unwanted compounds capable of adhering to the inner walls of the fluid transmitting conduits, the magnetic fluid conditioner having means for directing the outwardly radiating magnetic flux toward the fluid conducting conduits to thereby increase the magnetic flux acting on the liquid and/or gas flowing in the conduits.

7 Claims, 1 Drawing Sheet

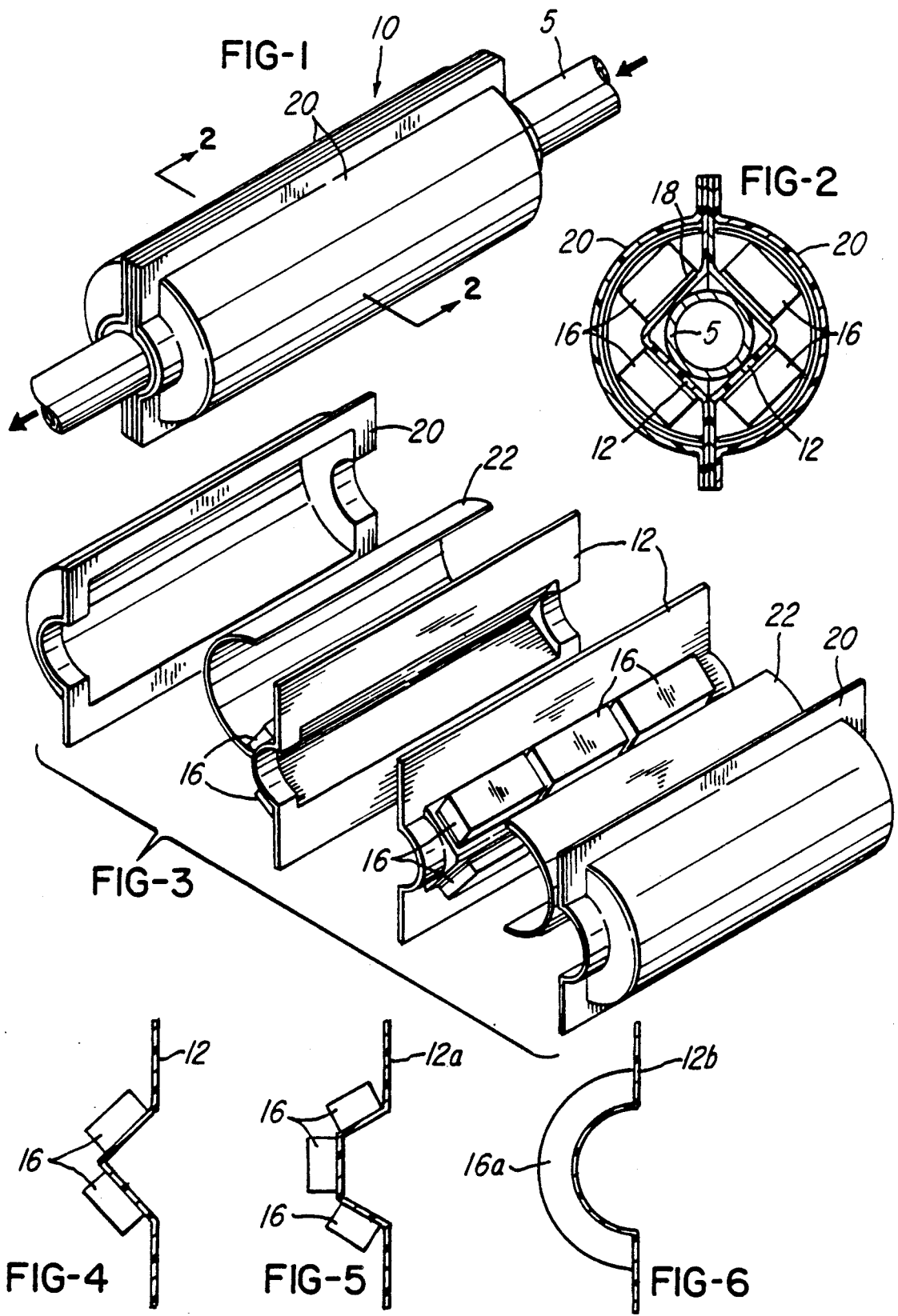

MAGNETIC FLUID CONDITIONER

BACKGROUND OF THE INVENTION

During the past 20 years there has been an ever-increasing interest in the treatment of fluids, flowing in conduits, by means of magnetic devices which are externally attached to the conduits transmitting the fluids, which term includes both liquids and gases. The major problem for which magnetic fluid conditioners are used is the problem of precipitates which will adhere to the inner walls of the conduits and, even if the precipitates are non-corrosive, will thereby decrease the effective cross-sectional area of the conduits as well as increasing the flow resistance within the conduits.

The best known example, because it affects every household to some degree, is the incrustation of calcium salts and other compounds in water transmitting installations. After there is sufficient detrimental buildup in the pipes, it becomes necessary to replace the pipes because there is no way for removing the incrustation. The best solution of the problem is to prevent the incrustation by magnetically acting on the offending compounds by causing them to remain in solution and to be discharged in the flowing water as the water is expended.

Magnetic fluid conditioners are also being used for the same purposes by industry, and on conduits transmitting crude oil where such devices substantially decrease the buildup of paraffin on the interior walls of the conduits. The chemical industry is finding more and more uses for magnetic fluid conditioners as a means for abating many of their flow problems.

Magnetic fluid conditioners have at least two basic requirements which must be met. The magnets must be in close proximity to the fluid transmitting conduits, and, the fluid conditioner must have a housing for holding the magnets and for attachment to the conduit. A typical conditioner is U.S. Pat. No. 4,605,498 Apparatus For Magnetic Treatment of Liquids, Kulish, which issued Aug. 12, 1986. The most common method for holding the magnets in position within the housing is by the use of potting material, although other methods may be used.

Although electro-magnets may be used in magnetic fluid conditioners, permanent magnets are the preferred source of magnetic flux. Electro-magnets require the constant imput of outside energy (electricity) and also present the danger of causing an explosion by a defective device when operating in an explosive environment.

Permanent magnets have the advantage of low cost, requiring no outside power, and of being safe in any environment. Efforts have been made to increase the effectiveness of permanent magnets in fluid conditioners by utilizing a higher percentage of the available flux. The inventors are not aware of any published art directed toward this objective other than their own U.S. Pat. No. 4,711,271 Magnetic Fluid Conditioner, Weisenbarger et al which issued Dec. 8, 1987 on an application filed Dec. 15, 1986.

A review of U.S. Pat. No 4,711,271 will show that all the conditioners taught by this patent use links of magnetic material between and in direct contact with magnets on opposing sides of the fluid conducting conduits to which the fluid conditioners are attached.

SUMMARY OF THE INVENTION

The present invention is the result of additional experimentation directed toward utilizing magnetic flux, which would otherwise flow in external paths, by directing the flux toward the center of the magnetic fluid conditioner where it will increase the flux acting on the fluid being conditioned. This is accomplished by means of deflecting or reflecting shields which are positioned between the magnets and the outer wall of the housing. Another species places the shield on the outside of the housing.

BEST KNOWN PRIOR ART

The best known prior art is applicants' U.S. Pat No. 4,711,271 Magnetic Fluid Conditioner which issued Dec. 8, 1987 from application Ser. No. 942,003 filed Dec. 15, 1986. The principal novelty is in the use of metallic magnetic straps to make direct flux connections between magnets acting on opposing sides of a fluid conducting conduit.

BRIEF DESCRIPTION OF THE DRAWINGS

FIG. 1 is a perspective depicting one species of the magnetic fluid conditioner installed on a fluid conducting conduit, the conduit not comprising an element of the invention;

FIG. 2 is a cross-section taken along line 2—2 of FIG. 1 and depicting internal elements of a typical magnetic fluid conditioner;

FIG. 3 is an exploded perspective of the magnetic fluid conditioner depicting the elements comprising the magnetic fluid conditioner depicted in FIGS. 1 and 2;

FIG. 4 depicts a cross-section of the inner housing element on which permanent bar magnets are mounted;

FIG. 5 is comparable with FIG. 4 and depicts a variation in the shape of the inner housing element to permit an increase in the number of bar magnets; and, FIG. 6 is comparable with FIGS. 4-5 and depicts another variation in the cross-sectional shape of the inner housing element to permit the use of elongated permanent magnets having an arcuate cross-section.

DESCRIPTION OF THE PREFERRED EMBODIMEMT

The species of the invention which was depicted and which will be described in detail, is primarily intended for installation on existing plumbing where it is to be installed without disturbing the plumbing, after which the two half-units of the conditioner may be united in a manner to prevent easy removal of the conditioner from the plumbing.

In FIG. 1 the magnetic fluid conditioner 10 is installed on a conduit 5 which does not comprise an element of the present invention. For purposes of illustration, the conduit may be assumed to be an iron pipe in a household water supply system.

In common with many magnetic fluid conditioners, the housing of the fluid conditioner 10 is made of symmetrical half sections for ease of fabrication and installation on existing conduit systems. Although in the particular installation depicted, two half-sections are used, each half-section is complete in itself, and, within the scope of the present invention, constitutes a complete magnetic fluid conditioner. Also, it must be understood that any number of such so-called half sections may be used depending on the size of the magnetic units and the diameter of the conduit on which they are to be externally installed. It must also be noted that, within the scope of the invention, an even or an odd number of units may be circumferentially mounted on a fluid conducting conduit. In the exploded perspective of FIG. 3, like parts of the two halves carry like numerals.

The innermost elements 12 of the housing are contoured at the ends to fit around the conduit 5 and have an elongated trough 14 having flat sides of substantially square cross-section as is best illustrated in FIG. 2 and FIG. 4. The flat sides of the cavity form convenient surfaces on which to mount permanent magnets 16 by means of adhesive mounting strips 18 as shown in FIG. 2.

As depicted in FIG. 3, three elongated permanent bar magnets 16 are mounted in each of the two rows of magnets. If desired, single magnets of longer length may be substituted for the three depicted magnets.

The magnetic fluid conditioner which has been depicted is intended for installation on relatively small diameter conduits such as used in household water supply systems, for example. Fluid conditioners for use on larger diameter conduits, because of their much larger circumference, permit an increase in the number of rows of magnets which may be used.

FIG. 4 depicts a fragmentary cross-section of the inner housing element 12 on which magnets 16 are mounted by liquid adhesive as a substitute for the adhesive strips 18 depicted in FIGS. 2–3.

FIG. 5 depicts in cross-section an inner housing element 12a which is contoured to permit the mounting of three rows of magnets 16.

FIG. 6 depicts in cross-section an inner housing element 12b which is contoured to permit the mounting of one or more permanent magnets 16a having an arcuate cross-section.

The outer housing elements 20 complete the visible elements of the magnetic fluid conditioner. Both the inner housing elements 12 and the outer housing elements 20 have extending flanges as depicted in FIGS. 1–3. After the elements within the magnetic fluid conditioner are in place, the housing elements 12 and 20 may be united by liquid adhesive spread over the extending flanges thereon, or by thermal fusion.

The primary improvement over prior art magnetic fluid conditioners is produced by the deflecting or reflecting shield 22. These shields have been found to deflect a large percentage of the flux which would otherwise follow paths outside of the fluid conditioner, and to redirect this flux back to the center of the fluid conditioner where it will supplement the internal flux pattern. This will increase the fluid conditioning effect produced by the magnets. Stated in other words, the productive flux will be increased by the amount the non-productive flux is decreased.

The deflecting shields 22 may be made of a suitable magnetic material such as rolled sheet steel, and are placed between the magnets 16 and the inner wall of the outer housing element 20. As depicted in FIGS. 2–3, the deflecting shields have an arcuate cross-section; however, other shapes may be used depending on the arrangement of the magnets. The deflecting shields nest in position, and it is not necessary that they be firmly held in position against the magnets or the inner wall of the outer housing element 20.

When the two halves of the magnetic fluid conditioner are installed on a conduit as depicted in FIG. 1, the two halves may be held in installed position by adhesive between abutting flanges, by thermal fusion, by spring clips, or by bolts and nuts, all of which are fastening methods well known in the art.

There are numerous designs of magnetic fluid conditioners, some of which have segmented sections which are joined on assembly, while others use a one piece housing and the magnets positioned to be on opposing sides of the conduit on which they are to be placed. No novelty is claimed in the prior designs without a flux deflecting shield which is the salient novelty of the present invention. If desired, the flux deflecting shield may be placed on the outside of the housing, either as an integral part of the housing, or to be removable.

Each of the so-called half sections as shown and described above is a complete and functional magnetic fluid conditioner in itself. Although the species depicted and described above is adaptable for use on small diameter fluid conducting conduits, there are better external configurations for use on large diameter conduits, as for example, a 24 inch steel conduit transporting crude oil to a refinery. For such applications it would be preferable to use a plurality of conditioners which are circumferentially positioned on the conduit. The curvature of the fluid conditioners to abut against the conduit should be made to substantially the curvature of the conduit on which they are to be mounted.

Although the housing of magnetic fluid conditioners are usually made of a dielectric plastic, for use on large diameter fluid conducting conduits, the housings may be made of non-magnetic metal such as aluminum which will permit the tack welding of the fluid conditioner to the fluid conducting conduit.

It is to be understood that the embodiments of the present invention as shown and described are to be regarded as merely illustrative, and that the invention is susceptible to variations, modifications, and changes without regard to specific construction methods, within the scope of the appended claims.

We claim:

1. A magnetic fluid conditioner for acting on a fluid being transmitted through a fluid transmitting conduit, said fluid conditioner comprising:
    (a) a housing for externally abutting against a portion of said fluid conducting conduit, said housing having at least one elongated cavity therein to be substantially parallel with the longitudinal axis of said transmitting conduit;
    (b) an elongated permanent bar magnet within each cavity of said housing positioned to be substantially parallel with the longitudinal axis of said fluid transmitting conduit; and,
    (c) a magnetic flux deflection shield within each cavity of said housing, each of said deflection shields being positioned between said permanent bar magnets and the outer wall of said cavities in said housing, each of said deflection shields being elongated with an arcuate transverse cross-section for deflecting a portion of the magnetic flux which would otherwise form flux paths outside of said magnetic fluid conditioner and deflecting said flux in the direction of said fluid transmitting conduit.

2. A magnetic fluid conditioner for acting on a fluid being transmitted through a fluid transmitting conduit, said fluid conditioner having two half-sections, each half-section comprising:
    (a) an elongated housing having at least the end portions contoured to externally abut against said fluid transmitting conduit, and further having an elongated cavity therein substantially parallel with the longitudinal axis of said fluid transmitting conduit;

(b) a magnetic means within the cavity of said housing; and, (c) a magnetic flux deflection shield within the cavity of said housing, said deflection shield positioned between said magnetic means and the outer wall of said cavity in said housing, said deflection shield being contoured for deflecting a portion of said magnetic flux which would otherwise form flux paths outside of said magnetic fluid conditioner and deflecting said flux in the direction of said fluid transmitting conduit.

3. A magnetic fluid conditioner in accordance with claim 2 in which said magnetic means is at least one permanent magnet.

4. A magnetic fluid conditioner in accordance with claim 2 in which said magnetic means is at least one elongated permanent bar magnet positioned to be substantially parallel with the longitudinal axis of said fluid transmitting conduit.

5. A magnetic fluid conditioner in accordance with claim 2 in which said flux deflection shield is elongated with an arcuate transverse cross-section.

6. A magnetic fluid conditioner for acting on a fluid being transmitted through a fluid transmitting conduit, said fluid conditioner comprising:

(a) a housing for externally abutting against a portion of said fluid transmitting conduit, said housing having at least one cavity therein substantially parallel with the longitudinal axis of said fluid transmitting conduit;

(b) an elongated permanent bar magnet within each cavity of said housing positioned to be substantially parallel with the longitudinal axis of said fluid transmitting conduit; and, (c) at least one flux deflection shield abutting the outside wall of said housing, each of said deflection shields being elongated with an arcuate transverse cross-section for deflecting a portion of the magnetic flux which would otherwise form flux paths outside of said magnetic flux conditioner and deflecting said flux in the direction of said fluid transmitting conduit.

7. A magnetic fluid conditioner for acting on a fluid being transmitted through a fluid transmitting conduit, said fuid conditioner having two half sections, each half section comprising:

(a) an elongated housing having at least the end portions contoured to externally abut against said fluid transmitting conduit, and further having an elongated cavity therein substantially parallel with the longitudinal axis of said fluid transmitting conduit;

(b) an elongated permanent bar magnet within the cavity of said housing positioned to be substantially parallel with the longitudinal axis of said fluid transmitting conduit; and, (c) a flux deflection shield abutting the outer wall of said housing, said deflection shield being elongated with an arcuate transverse cross-section for deflecting a portion of the magnetic flux which would otherwise form flux paths outside of said magnetic fluid conditioner and deflecting said flux in the direction of said fluid transmitting conduit.

* * * * *